(12) United States Patent
Ren

(10) Patent No.: US 8,799,365 B2
(45) Date of Patent: Aug. 5, 2014

(54) BROKER-BASED MANAGEMENT OF MOBILE DEVICES

(75) Inventor: Dahai Ren, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 135 days.

(21) Appl. No.: 13/246,892

(22) Filed: Sep. 28, 2011

(65) Prior Publication Data

US 2013/0080522 A1 Mar. 28, 2013

(51) Int. Cl.
*G06F 15/177* (2006.01)

(52) U.S. Cl.
USPC ........... 709/204; 713/150; 713/160; 713/181; 726/2; 726/16; 726/21

(58) Field of Classification Search
USPC ......... 709/204; 713/150, 160, 181; 726/2, 16, 726/21
See application file for complete search history.

(56) References Cited

U.S. PATENT DOCUMENTS

| 2008/0301231 A1* | 12/2008 | Mehta et al. | 709/204 |
| 2012/0036220 A1* | 2/2012 | Dare et al. | 709/217 |
| 2012/0302204 A1* | 11/2012 | Gupta et al. | 455/406 |

FOREIGN PATENT DOCUMENTS

AU 2011022752 * 3/2011

* cited by examiner

*Primary Examiner* — Jason K. Gee
*Assistant Examiner* — Sharif E Ullah

(57) ABSTRACT

An authorized blocker application is installed on a user device to monitor application usage and enforce usage restrictions. A network device receives, from the user device, information identifying a list of applications installed on the user device and receives from a customer terminal, configuration settings including usage restrictions for at least one application from the list of applications. The network device receives, from the user device, application usage data for the at least one application from the list of applications and compares the configuration settings received from the customer terminal and the application usage data received from the user device. When the application usage data includes times exceeding the configurations settings, the network device sends, to the user device, a blocking instruction to prevent use of the at least one application.

20 Claims, 11 Drawing Sheets

FIG. 8A

Time restrictions for Jimmy's Phone

Set by: [Individual Apps.] — 812

| Daily | LIMITS |
|---|---|
| App. #1 | [—] min. |
| App. #2 | [—] min. |
| App. #3 | [—] min. |
| App. #4 | [30] min. |
| App. #5 | [30] min. |
| App. #6 | [—] min. |
| App. #7 | [15] min. |
| App. #8 | [30] min. |
| App. #9 | [15] min. |
| App. #10 | [0] min. |
| TOTAL: | [120] min. |

— 814

[Clear] [Apply]

Time restrictions for Jimmy's Phone

Set by: [App. Groups] — 822

| Daily | SELECT APPS FOR GROUP |
|---|---|
| App. #1 | [ ] |
| App. #2 | [ ] |
| App. #3 | [✓] |
| App. #4 | [✓] |
| App. #5 | [✓] |
| App. #6 | [✓] |
| App. #7 | [ ] |
| App. #8 | [ ] |
| App. #9 | [✓] |
| App. #10 | [✓] |
| GROUP LIMIT: | [60] min. |

— 824

[Clear] [Apply]

820

BROKER-BASED MANAGEMENT OF MOBILE DEVICES

BACKGROUND

As mobile electronic devices (such as tablet computers, smartphones, etc.) are becoming more prevalent, users are increasingly using application software (or "apps") that rely on a mobile data network to transmit and/or receive information. These apps may provide numerous conveniences and social interaction. However, parents and guardians, for example, may seek ways to limit use of particular applications and encourage better time management by their children.

BRIEF DESCRIPTION OF THE DRAWINGS

FIGS. 8A and 8B are diagrams of illustrative user interfaces for setting application usage limits that may be presented on a customer terminal according to implementations described herein;

DETAILED DESCRIPTION OF PREFERRED EMBODIMENTS

The following detailed description refers to the accompanying drawings. The same reference numbers in different drawings may identify the same or similar elements.

Systems and/or methods described herein may provide tools to enable parents and/or guardians to monitor and/or restrict use of applications on user devices (e.g., mobile devices used by children) within a shared data plan. A blocker application may be included on the restricted user devices to monitor and enforce restrictions provided by the parent and/or guardian. New and/or updated parental settings for the blocker application may be provided to a remote server that forwards the changes to the restricted user devices. Usage data for the restricted user devices may also be uploaded to remote servers to allow for viewing by the parent and/or guardian.

In one implementation, an authorized blocker application may be installed on a user device to monitor application usage and enforce usage restrictions. A network device may receive, from the user device, information identifying a list of applications installed on the user device and may receive from a customer terminal, configuration settings including usage restrictions for at least one application from the list of applications. The network device may receive, from the user device, application usage data for the at least one application from the list of applications and may compare the configuration settings and the application usage data. When the application usage data includes times or other information exceeding the configurations settings, the network device may send, to the user device, a blocking instruction to prevent use of the at least one application.

Figure 1:
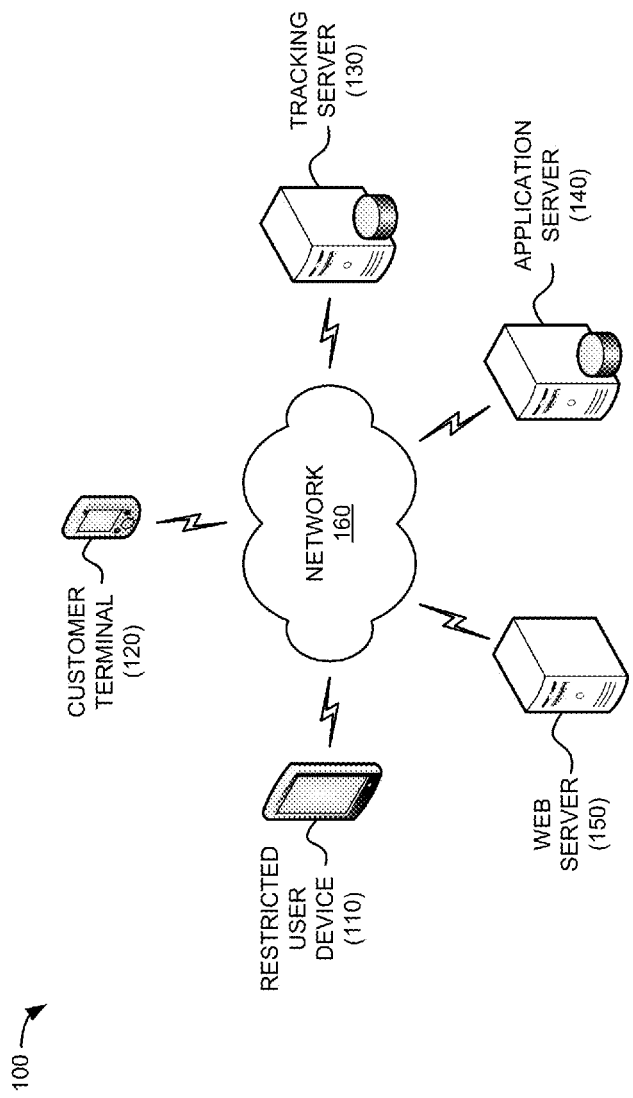
FIG. 1 is a diagram of a network in which systems and/or methods described herein may be implemented.

FIG. 1 is a diagram of a network 100 in which systems and/or methods described herein may be implemented. As illustrated, network 100 may include a restricted user device 110, a customer terminal 120, a tracking server 130, an application server 140, and a web server 150 interconnected by a network 160. Components of network 100 may interconnect via wired and/or wireless connections. A single user device 110, customer terminal 120, tracking server 130, application server 140, web server 150, and network 160 have been illustrated in FIG. 1 for simplicity. In practice, there may be more or fewer components of network 100. Also, in some instances, one or more of the components of network 100 may perform one or more functions described as being performed by another one or more of the components of network 100.

User device 110 may include one or more devices capable of storing/executing applications and sending/receiving information (e.g., voice, data, broadband applications, etc.). User device 110 may include, for example, a tablet computer, a smart phone, a personal communications system (PCS) terminal (e.g., that may combine a cellular radiotelephone with data processing and data communications capabilities), a wireless device (e.g., a wireless telephone), a cellular telephone, a laptop computer (e.g., with a broadband air card), a portable gaming system, a music playing device, or other types of mobile communication devices. User device 110 may include one or more stored applications with various functionalities, such as travel, traffic, weather, dictionary/reference, currency/mathematical conversions, sports scores, news, etc.

In one implementation, user device 110 may store and execute a particular application, referred to herein as a "blocker application," that monitors and/or restricts usage of other applications on user device 110. For example, the blocker application may cause user device 110 to identify and provide (e.g., to tracking server 130) a list of applications (e.g., applications that may be monitored) residing on user device 110. The blocker application may also be configured to execute instructions (e.g., from tracking server 130) to block use of particular applications during certain time periods and/or to limit use of particular applications to certain durations.

Customer terminal 120 may include a computation or communication device, such as a personal computer, that is capable of communicating with tracking server 130, application server 140, web server 150, and/or other devices. For example, customer terminal 120 may include a desktop computer, a laptop computer, a tablet computer, a smart phone, or another computation or communication device. Customer terminal 120 may include, for example, features similar to those of user device 110.

Tracking server 130 may include one or more server devices, network devices, or other types of computation or communication devices, that gather, process, search, and/or provide information in a manner described herein. In one implementation, tracking server 130 may receive blocker application data from one or more user devices 110. Tracking server 130 may store and/or classify the blocker application data (e.g., particular applications, time periods, etc.) associated with user devices 110. Tracking server 130 may also provide blocker application statistics and/or classifications to a particular customer terminal 120 (e.g., associated with a particular user device 110) for presentation to a customer.

In one implementation, tracking server 130 may include a database or another memory component that stores data representing available data services and/or access for a given customer account. The database may be implemented as, for example, a relational or non-relational database capable of storing and accessing data. The database may be implemented on a single computing device or distributed across many computing devices and/or storage devices. In some alternative implementations, the database may be implemented as a simple "flat" file or other similar structure.

Application server 140 may include one or more server devices, network devices, or other types of computation or communication devices, that gather, process, search, and/or provide information in a manner described herein. Application server 140 may provide data to push application software and content to user devices 100. For example, application server 140 may provide applications and associated metadata that may be downloaded by user devices 110. In one implementation, application server 140 may provide a blocker application that monitors and/or restricts usage of other applications on user device 110. Application server 140 may provide applications for a particular hardware and/or software environment. For example, application server 140 may provide different versions of blocker applications that are particularly configured for proprietary operating systems running on user device 110 or other devices.

Web server 150 may include one or more server devices, network devices, or other types of computation or communication devices, that gather, process, search, and/or provide information in a manner described herein. In one implementation, web server 150 may supply web services for use by customer terminal 120. Web server 150 may dynamically generate web pages for each customer accessing web server 150. In particular, consistent with aspects described herein, web server 150 may transmit data (e.g., particular user device 110 data), hypertext markup language (HTML) documents, and/or scripts (e.g., JavaScript, VBScript, or other computer code) to customer terminal 120. The scripts may include, for example, script for soliciting configuration settings for a blocker application (e.g., associated with a particular user device 110), generating real time data graphs, and/or linking objects.

In one implementation, tracking server 130, application server 140, and web server 150 may be included in a private network that restricts access to authorized external users. For example, access to information residing on tracking server 130, application server 140, and/or web server 150 may be restricted to customers with account privileges that may require a login procedure (e.g., verification of an account name and password).

Network 160 may include one or more networks, such as a wireless network, a satellite network, the Internet, a telephone network (such as the Public Switched Telephone Network (PSTN)), a metropolitan area network (MAN), a wide area network (WAN), a local area network (LAN), a mesh network, or another type of network. In an one implementation, other network 160 may include a combination of networks and other components (e.g., switches, routers, etc.) for transmitting data to and from user device 110, customer terminal 120, tracking server 130, application server 140, web server 150, and/or other devices (not shown).

Figure 2:
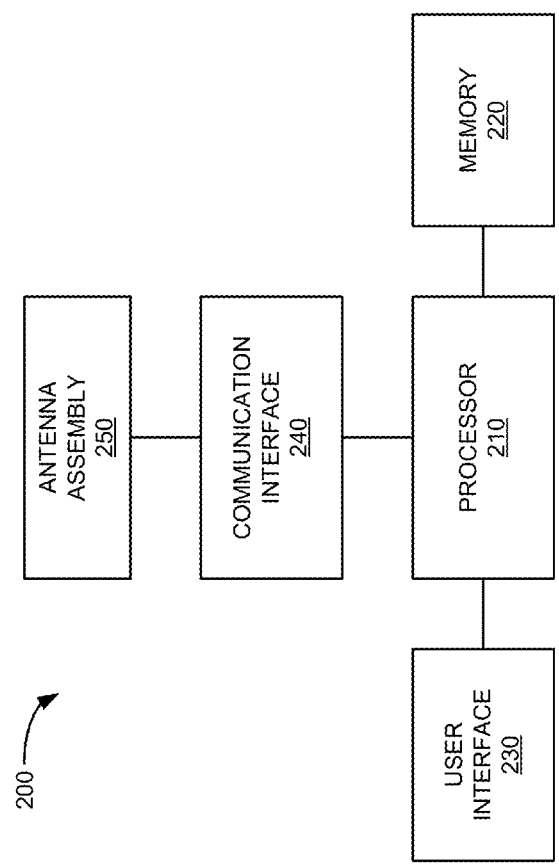
FIG. 2 is a diagram of illustrative components of a user device of FIG. 1.

FIG. 2 is a diagram of illustrative components of a device 200. Device 200 may correspond to, for example, user device 110 or customer terminal 120. As illustrated, user device 200 may include a processor 210, a memory 220, a user interface 230, a communication interface 240, and/or an antenna assembly 250.

Processor 210 may include one or more microprocessors, application specific integrated circuits (ASICs), field programmable gate arrays (FPGAs), or the like. Processor 210 may control operation of device 200 and its components. In one implementation, processor 210 may control operation of components of device 200 in a manner described herein.

Memory 220 may include a random access memory (RAM), a read-only memory (ROM), and/or another type of memory to store data and instructions that may be used by processor 210.

User interface 230 may include mechanisms for inputting information to device 200 and/or for outputting information from device 200. Examples of input and output mechanisms might include buttons (e.g., control buttons, keys of a keypad, a joystick, etc.); a speaker to receive electrical signals and output audio signals; a microphone to receive audio signals and output electrical signals; a display to receive touch input and/or to output visual information; a vibrator to cause device 200 to vibrate; and/or a camera to receive video and/or images.

Communication interface 240 may include, for example, a transmitter that may convert baseband signals from processor 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air, and receive RF signals over the air and provide them to communication interface 240. In one implementation, for example, communication interface 240 may communicate with a network and/or devices connected to a network.

As will be described in detail below, device 200 may perform certain operations described herein in response to processor 210 executing software instructions of an application contained in a computer-readable medium, such as memory 220. A computer-readable medium may be defined as a physical or logical memory device. A logical memory device may include a space within a single physical memory device or spread across multiple physical memory devices. The software instructions may be read into memory 220 from another computer-readable medium or from another device via communication interface 240. The software instructions contained in memory 220 may cause processor 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows illustrative components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
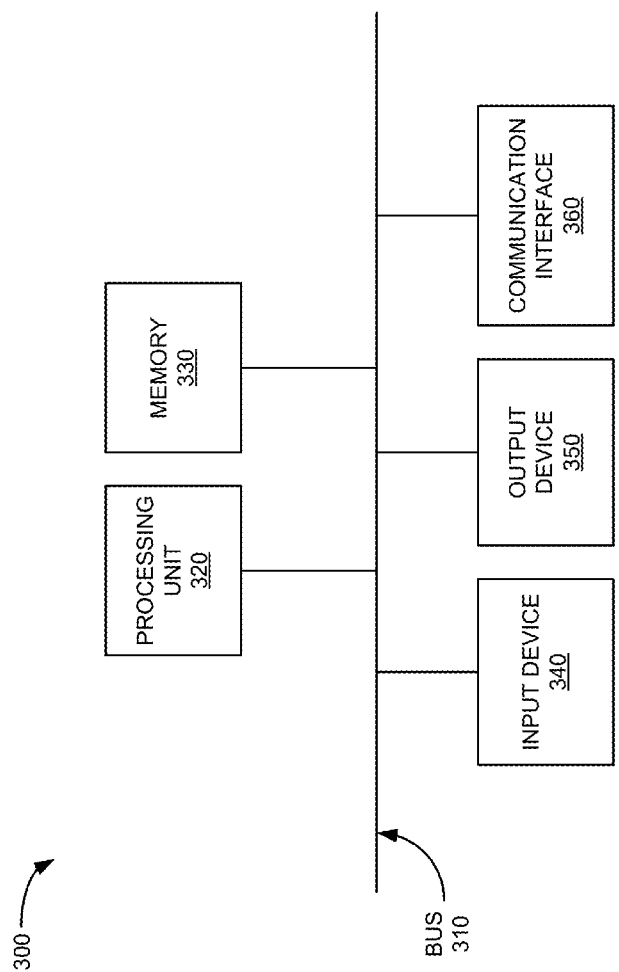
FIG. 3 is a diagram of illustrative components of one or more of the other devices of the network depicted in FIG. 1.

FIG. 3 is a diagram of illustrative components of a device 300 that may correspond to one of tracking server 130, application server 140, or web server 150. In another implementation, device 300 may also correspond to user device 110 or customer terminal 120. Each of tracking server 130, application server 140, or web server 150 (or user device 110 or customer terminal 120) may include one or more devices 200. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for execution by processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, or the like. Output device 350 may include a device that outputs information to the operator, such as a display, a speaker, etc.

Communication interface 360 may include a transceiver (e.g., a transmitter and/or receiver) that enables device 300 to communicate with other devices and/or systems. For example, communication interface 360 may include mechanisms for communicating with other devices, such as other devices of network 100 or another device 300.

As described herein, device 300 may perform certain operations in response to processing unit 320 executing software instructions contained in a computer-readable medium, such as memory 330. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more other tasks described as being performed by one or more other components of device 300.

Figure 4:
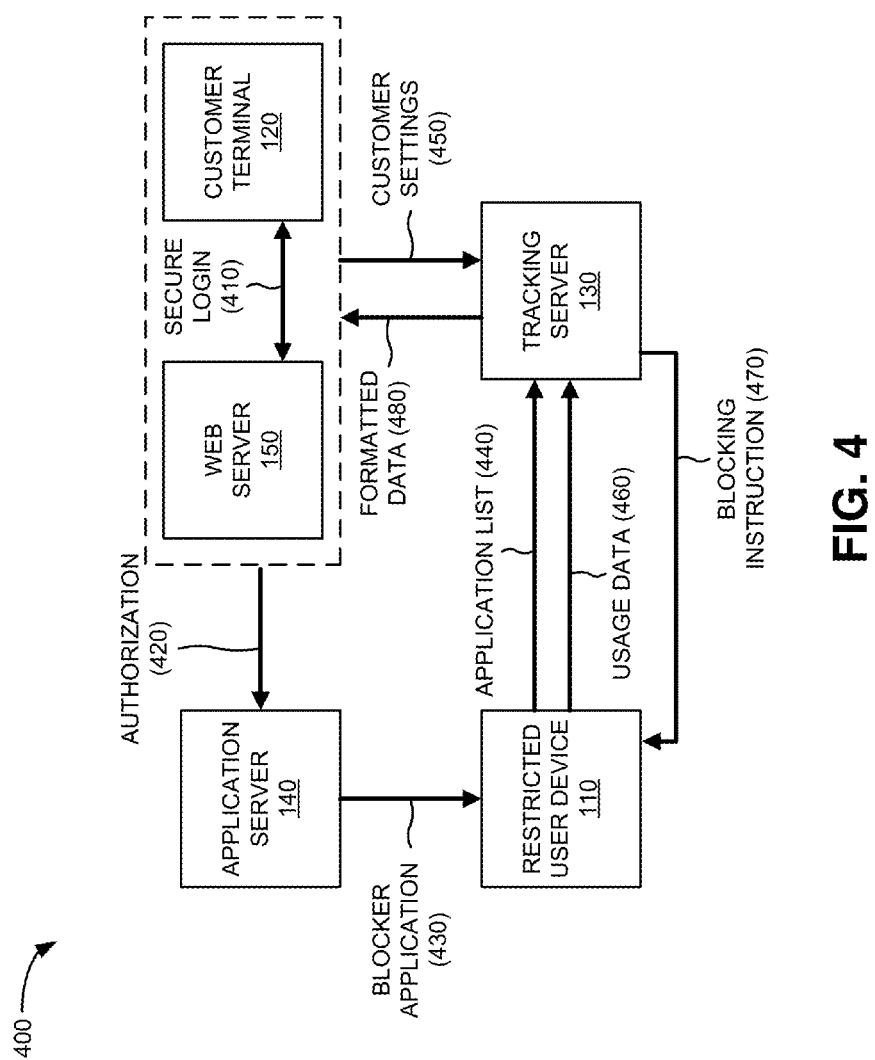
FIG. 4 is a diagram of illustrative communications within a portion of the network of FIG. 1.

FIG. 4 is a diagram of illustrative communications for a portion 400 of network 100. As shown in FIG. 4, network portion 400 may include user device 110, customer terminal 120, tracking server 130, application server 140, and web server 150. User device 110, customer terminal 120, tracking server 130, application server 140, and web server 150 may include features described above in connection with, for example, FIGS. 1-3.

As shown in FIG. 4, customer terminal 120 may perform a secure login 410 with web server 150 to access a customer account. Secure login 410 may include, for example, exchanging and verifying (e.g., by web server 150 or another device) an account name and password. The customer account may include, for example, shared data plan for a wireless network or another shared network account that provides network access by user device 110. Assuming secure login 410 is successful, customer terminal 120 may be permitted to communicate with other servers, such as tracking server 130 and application server 140. In one implementation, web server 150 may serve as an intermediary for communications between customer terminal 120 and tracking server 130/application server 140. In another implementation, web server 150 may provide information to facilitate direct communications between customer terminal 120 and tracking server 130/application server 140. For simplicity, communications in FIG. 4 are described as coming directly from/to customer terminal 120 regardless of whether web server 150 may act as an intermediary device.

Customer terminal 120 may provide an authorization 420, to application server 140, to provide a blocker application to a particular user device, such as restricted user device 110. Authorization 420 may be provided, for example, as part of a data plan activation, a service upgrade order, or another online transaction. In another implementation, authorization 420 may be provided by a customer (e.g., orally, via written contract, etc.) to a service provider representative (not shown) who can relay authorization 420 to application server 140. For example, a customer (e.g., a parent) may sign a consent agreement to allow a background running client application to be downloaded and installed on user devices of their children (e.g., restricted user device 110).

In response to authorization 420, application server 140 may provide a blocker application 430 to restricted user device 110. For example, application server 140 may provide blocker application 430 and/or blocker application updates. Blocker application 430 may include monitoring instructions/criteria, a directory structure, connection information for tracking server 130, and other information to facilitate logging and/or blocking of application use on restricted user device 110. In one implementation, blocker application 430 may be installed as part of an operating system update for restricted user device 110. In another implementation, blocking application 430 may be provided with restricted user device 110 as original equipment manufacturer (OEM) equipment. Thus, only updates/activation codes would be provided to restricted user device 110 by application server 140. In another implementation, blocker application 430 may be provided, for example, over an established TCP/IP (Transmission Control Protocol/Internet Protocol) connection.

Blocker application 430 may be executed in the background and not visible to a user of restricted user device 110. Blocker application 430 may also have a higher level of privileges than traditional applications to allow blocker application 430 to monitor and/or disable use of other applications (e.g., traditional applications residing on restricted user device 110). In one implementation, blocker application 430 may not be removed from user device 110 without entry of customer credential information, such as a password.

As shown in FIG. 4, blocker application 430 may cause restricted user device 110 to identify applications, residing on restricted user device 110, that are able to be monitored and/or restricted by blocker application 430. For example, blocker application 430 may conduct a scan of configuration files on restricted user device 110 to identify stored applications. User device 110 may provide discovered applications to tracking server 130 as application list 440.

Tracking server 130 may receive and store application list 440 for use in soliciting customer settings. A customer may use customer terminal 120 to access application list 440 and provide customer settings for limiting access to one or more applications on restricted user device 110. In one implementation, customer terminal 120 may request, and tracking server 130 may provide, a user interface (e.g., an interactive web page) to enter customer settings. Customer terminal 120 may provide customer settings 450 to tracking server 130. Customer settings 450 may include configurations for particular applications, such as time limits or other usage restrictions, that may be enforced by tracking server 130 and/or blocker application 430. In one implementation, tracking server 130 may store customer settings 450 for comparison against later usage data from restricted user device 110. In another implementation, tracking server 130 may forward (not shown) some or all of customer settings 450 to restricted user device 110 for implementation by blocker application 430.

Restricted user device 110 (e.g., executing blocker application 430) may collect usage statistics of traditional applications being used on restricted user device 110. For example, restricted user device 110 may track times when applications are opened/closed, time stamps for transferring data, and/or a number of use instances of applications. In another implementation, restricted user device 110 may also limit and/or block use of particular applications based on customer settings 450 (e.g., if customer settings 450 are forwarded to and/or stored by restricted user device 110). Application usage information collected by user device 110 may be sent to tracking server 130 as usage data 460. Usage data 460 may be sent, for example, at periodic intervals, when connections are available, and/or when processor capacity (e.g., processor 210 of restricted user device 110) is available. In one implementation, usage data 460 may be sent in real or near-real time.

Tracking server 130 may receive usage data 460 and compare usage data 460 with customer settings 450 (e.g., for the particular restricted user device 110). In instances where usage data 460 indicates an application usage has exceeded parameters in customer settings 450, tracking server 130 may provide a blocking instruction 470 to restricted user device 110 (e.g., blocker application 430). Blocking instruction 470 may identify, for example, particular applications that may be rendered inaccessible to a user of restricted user device 110. In one implementation, blocking instruction 470 may also indicate a duration (e.g., a time period or expiration time) for blocking instruction 470. In another implementation, tracking server 130 may provide separate blocking instructions 470 to initiate and terminate a blocking period. Restricted user device 110 may receive blocking instruction 470 and prevent a user's access to one or more applications based on blocking instruction 470.

Tracking server 130 may also format usage data 460 into a format that may be relevant to a customer. Tracking server 130 may provide the formatted data to customer terminal 120 as formatted data 480. For example, in response to a request (not shown) from customer terminal 120, tracking server 130 may provide a user interface (e.g., a web page) to customer terminal 120 that includes usage data 460 for the particular restricted user device 110 identified in the request. Customers may view formatted data 480 on customer terminal 120. Thus, customers may review how time consumption associated with use of user device 110 is distributed and determine if adjustments to customer settings 450 are required.

Although FIG. 4 shows example components of network portion 400, in other implementations, network portion 400 may contain fewer components, different components, differently arranged components, or additional components than depicted in FIG. 4. Alternatively, or additionally, one or more components of network portion 400 may perform one or more other tasks described as being performed by one or more other components of network portion 400. For example, in another implementation, restricted user device 110 may receive/store customer settings 450 and implement blocking decisions locally based on customer settings 450 and usage data 460.

Figure 5:
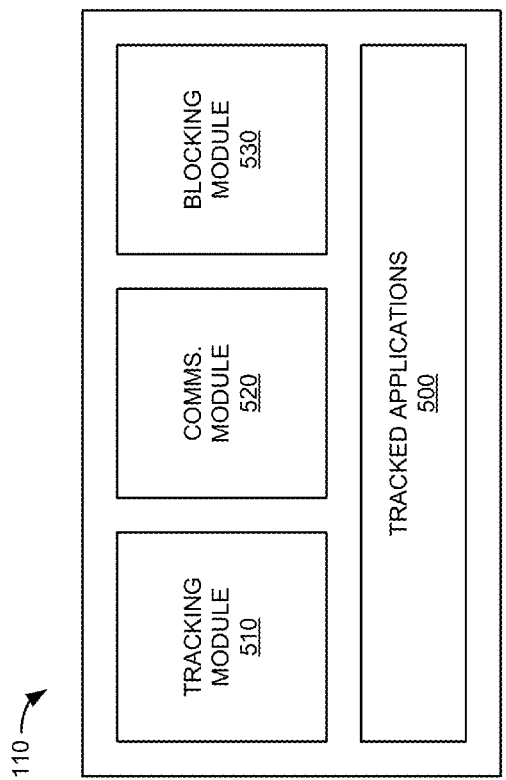
FIG. 5 is a diagram of illustrative functional components of a user device depicted in FIG. 1.

FIG. 5 is a diagram of functional components of user device 110. In one implementation, the functions described in connection with FIG. 5 may be performed by one or more components of device 200 illustrated in FIG. 2 (e.g., processor 210 executing instructions in memory 220). In another implementation, the functions described in connection with FIG. 5 may be performed by one or more components of device 300 (FIG. 3). As shown in FIG. 5, user device 110 may include tracked applications 500, a tracking module 510, a communications module 520, and a blocking module 530. In one implementation, tracking module 510, communications module 520, and blocking module 530 may be included as part of blocker application 430.

Tracked applications 500 may include any application installed and/or executed by user device 110. Tracked applications 500 may include, for example, games, social networking applications, web browsers, etc. Each of tracked applications 500 may include a unique identifier that may be used by other functional components (e.g., tracking module 510, communications module 520, and/or blocking module 530) to track and/or restrict use of particular applications. In one implementation, each application in tracked applications 500 may include a unique package name that is assigned when an application is made available for a particular operating platform. For example, in the case of Google's Android platform, each application may be assigned a unique package name to be made available for downloading from the "Android Market." The package name(s) may be used as a unique identifier to track/block the associated application on restricted user device 110.

Tracking module 510 may collect information about use of tracked applications 500. For example, tracking module 510 may collect and/or generate a list of tracked applications 500. For each of tracked applications 500 (which may correspond to each application residing on restricted user device 110 or a subset thereof), tracking module 510 may log time stamps associated with opening and/or closing an application, instances of using an application, a total amount of time an application is in use, or another indication of use. In one implementation, tracking module 510 may use unique identifiers associated with tracked applications 500 to identify which application is being used by a user of restricted user device 110.

Communications module 520 may manage receipt of customer settings (e.g., customer settings 450) from tracking server 130, receipt of application updates from application server 140, and transfer of usage statistics (e.g., usage data 460) to tracking server 130. In one implementation, communications module 520 may cause restricted user device 110 to ping tracking server 130 and/or application server 140 for data/updates at regular intervals (e.g., once a day). In other implementations, tracking server 130 and/or application server 140 may initiate the provision of updates to blocker application 430 on restricted user device 110 as updates become available. For example, if tracking server 130 has data (e.g., customer settings 450) to send to restricted user device 110 and no TCP/IP connection exists, or data transfer over an existing TCP/IP connection is unsuccessful, tracking server 130 may utilize an identifier to send an indication to restricted user device 110. The identifier may include information to permit communication from tracking server 130 to restricted user device 110 outside of a TCP/IP connection. For example, the indication may be sent over an alternative channel that does not restrict server initiated messages/traffic. Examples of alternative channels may include: a Short Message Service (SMS) message, a User Datagram Protocol (UDP) push, or tracking server 130 sending an indication to an intermediate entity (e.g., an evolution-data optimized (EVDO) session manager or an access network base station controller (AN/BSC)) which in turns sends the indication to restricted user device 110 using a unicast access terminal identifier (UATI) assigned to restricted user device 110.

Communications module 520 may also send data (e.g., application list 440 and/or usage data 460) to tracking server 130. For example, communications module 520 may send data from tracking module 510 at periodic intervals or whenever a TCP/IP connection is available. Additionally, or alternatively, communications module 520 may send usage data to tracking server 130 in response to receiving a request from tracking server 130. In one implementation, communications module 520 may conduct communications with tracking server 130 as a background procedure. Thus, communications module 520 may send application list 440 and/or usage data 460 without requiring authorization from a user of restricted user device 110.

Blocking module 530 may implement instructions to block access to tracked applications 500. For example, customer settings 450 may provide a maximum time allowance for use of a particular application or group of applications on restricted user device 110. In one implementation, blocking module 530 may review usage data from tracking module 510. When the data from tracking module 510 identifies the time limit has been reached, blocking module 530 may override command signals for the particular application or group of applications to temporarily prevent access by a user. In another implementation, tracking server 130 may monitor usage data from tracking module 510 and send a signal to blocking module 530 when a time limit has been reached. Based on the signal from tracking server 130, blocking module 530 may override command signals for the particular application or group of applications to temporarily prevent access by a user.

In one implementation, blocking module 530 may prevent access to a particular application for a particular period (e.g., for the remainder of a 24-hour period). In another implementation, blocking module 530 may prevent access to a particular application until authorization to release the block is provided by a customer (e.g., using customer terminal 120). Additionally, blocking module 530 may provide an indication to a user of user device that access to an application has been blocked. For example, blocking module 530 may generate a message (e.g., a pop-up window) when a user of user device 110 attempts to access or continue use of an application that has been blocked. The message may include, for example, an indication that access to a particular application has been blocked, an explanation for the block, and/or a duration of the restriction.

Figure 6:
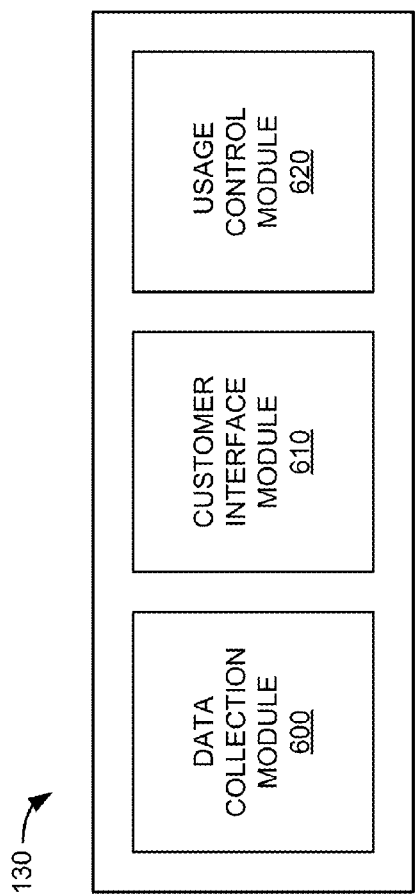
FIG. 6 is a diagram of illustrative functional components of a tracking server depicted in FIG. 1.

FIG. 6 is a diagram of functional components of tracking server 130. In one implementation, the functions described in connection with FIG. 6 may be performed by one or more components of device 300 illustrated in FIG. 3. As shown in FIG. 6, tracking server 130 may include a data collection module 600, a customer interface module 610, and a usage control module 620.

Data collection module 600 may receive usage data (e.g., usage data 460) from restricted user device 110 and may sort/assemble data for presentation to users of customer terminal 120. Data collection module 600 may store the received usage data in a database or other memory. In one implementation, data collection module 600 may associate the received usage data with a particular customer account that may include multiple restricted user devices 110.

Customer interface module 610 may solicit and receive configuration settings (e.g., customer settings 450) for blocker application 430 to restrict use of applications on restricted user device 110. For example, customer interface module 610 may provide an interactive web page to users of customer terminal 120 with a list of applications (e.g., applications on restricted user device 110) that can be restricted. Customers (e.g., using customer terminal 120) may provide settings (e.g., maximum time allowances) for one or more applications.

Customer interface module 610 may also provide a user interface to view usage statistics for applications on a particular restricted user device 110. For example, customer interface module 610 may retrieve stored application usage statistics from data collection module 600 and data customer settings from usage control module 620. In one implementation, customer interface module 610 may present usage statistics for particular applications in relation to limits in the customer settings. In another implementation, customer interface module 610 may present usage statistics for particular applications in relation to each other. Examples of user interfaces generated by customer interface module 610 are provided below in the connection with FIGS. 7A-7C. Additionally, or alternatively, customer interface module 610 may also provide notifications to a customer when an application is blocked on restricted user device 110. Notifications to customers may be provided, for example, to customer terminal 120 (e.g., if a customer is currently logged in to a tracking account) or via separate communications, such as a phone number (e.g., for a text message), email, etc., associated with a customer tracking account.

Usage control module 620 may provide instructions to blocker application 430 (e.g., residing on restricted user device 110) to block a target application when a maximum time allowance (e.g., as configured by customer settings 450) has been exceeded. For example, usage control module 620 may compare the application usage data (from data collection module 600) and the configuration settings (from the customer interface module 610). When the application usage data includes times exceeding (or otherwise outside the limits of) the configuration settings, usage control module 620 may send, to restricted user device 110, a blocking instruction to prevent use of restricted applications.

Figure 7A:
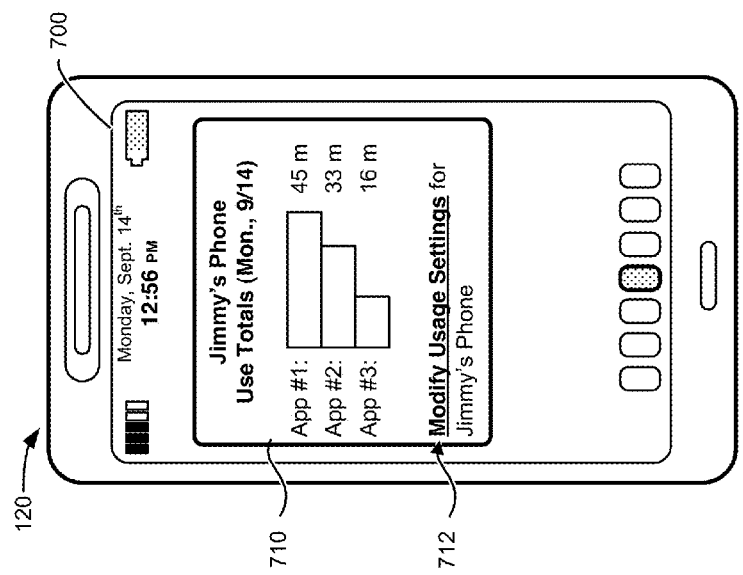
FIGS. 7A-7C are diagrams of illustrative user interfaces for application usage data that may be presented on a customer terminal according to implementations described herein.
Figures 7B, 7C:
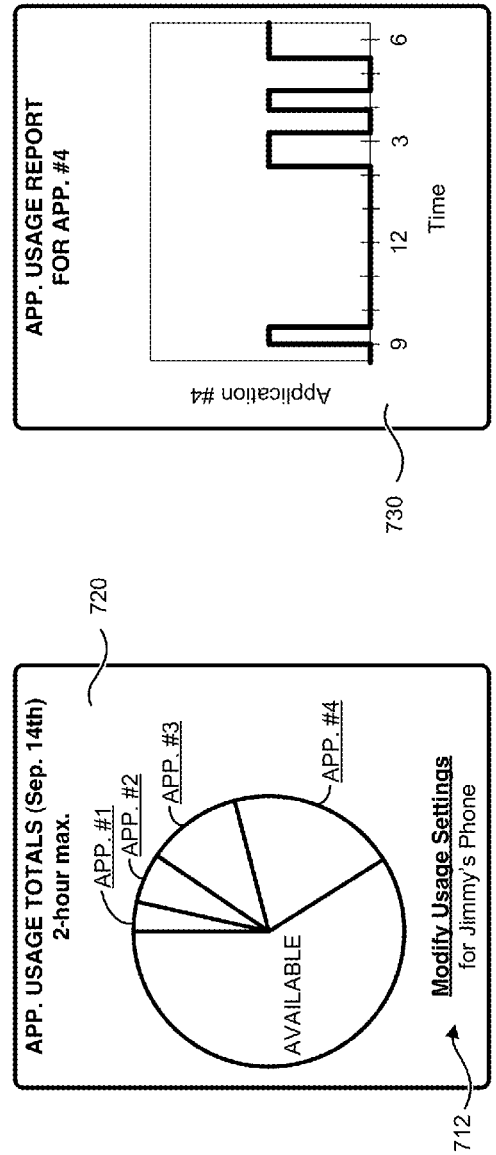

FIGS. 7A-7C are diagrams of illustrative user interfaces of application usage data that may be presented on customer terminal 120 according to implementations described herein. FIG. 7A provides a view of customer terminal 120, including a display screen 700, with an application use profile 710 displayed. Application use profile 710 may be generated, for example, by customer interface module 610 described above. Application use profile 710 may include a representation of application use associated with particular applications (e.g., "App #1," "App #2," and "App #3") for a particular period (e.g., "Monday, 9/14"). As shown in FIG. 7A, application use profile 710 includes use statistics for each of the particular applications that are shown in relation to each other (e.g., to provide a comparison of usage by each application). Application use profile 710 may be suitable, for example, when a customer has no particular limits for individual applications or is interested in identifying a most-used application. As further shown in FIG. 7A, in one implementation, application use statistics may be shown with graphical representations (e.g., a bar chart) and/or approximate values (e.g., 45 min., 33 min., 16, min.). In one implementation, application use profile 710 may include a link 712 that may allow a customer to access another user interface to modify configuration settings for restricted user device 110.

FIG. 7B provides a view of an application use profile 720, which may be presented on display screen 700 of customer terminal 120 (not shown in FIG. 7B). Application use profile 720 may be generated, for example, by customer interface module 610 described above. Application use profile 720 may include a representation of data use associated with particular applications (e.g., "App #1," "App #2," "App #3," and "App #4") for a particular period (e.g., "September 14th"). As shown in FIG. 7B, application use profile 720 may include application use statistics for each of the particular applications that are shown in relation to each other (e.g., to provide a comparison of usage of each application) and to an overall limit (e.g., 2 hours). Data use profile 720 may be suitable, for example, when a customer configures a maximum time allowance for a group of applications. In an implementation, application use profile 720 may include link 712 to allow a customer to access another user interface to modify configuration settings for restricted user device 110.

In one implementation, each particular application designator (e.g., "App #1," "App #2," "App #3," and "App #4") in application use profile 720 may include a link that may be selected to obtain additional usage data for the selected application, such as a breakdown of usage periods for the selected application. FIG. 7C provides a view of an application use report 730 for a particular application. Application use report 730 may be presented for example when a customer selects an application designator (e.g., "App. 4") from application use profile 720 in FIG. 7B. Application use report 730 may, for example, provide a graphical representation of use times for a particular application. In another implementation, application use report 730 may include a table or list of use times. In still another implementation, multiple applications may be included in application use report 730 by applying, for example, color-coded representations.

Although FIGS. 7A-7C show exemplary user interfaces associated with customer terminal 120, in other implementations, customer terminal 120 may present user interfaces with different or additional information than depicted in FIGS. 7A-7C. Also, customer interface module 610 may provide different formats for user interfaces 710-730 depending on the type of device used for customer terminal 120.

FIGS. 8A and 8B are diagrams of illustrative user interfaces for setting application usage limits that may be presented on customer terminal 120 according to implementations described herein. FIG. 8A illustrates a sample settings interface 810 for setting time limits for individual applications residing on restricted user device 110. FIG. 8B illustrates a sample settings interface 820 for setting time limits for groups of applications residing on restricted user device 110. Settings interfaces 810 and 820 may be generated, for example, by customer interface module 610 described above.

Referring to FIG. 8A, settings interface 810 may include a section 812 to select to provide time limit settings for individual applications. Settings interface 810 may include an input section 814 including a list of applications associated with a particular restricted user device 110 (e.g., "App #1," "App #2," . . . "App #10"). Input section 814 may include an individual input box associated with each listed application to allow a user to enter a usage time limit for each application. Each input box may include, for example, an input mechanism, such as a text box, dropdown menu, radio button, checkbox, etc. In one implementation, time limits may be provided for a particular recurring period (e.g., daily, weekly, after-school, etc.). Settings interface 810 may be suitable, for example, when a customer seeks to limit use of particular applications to particular durations. In addition, settings interface 810 may prohibit use of an application by entering zero minutes for that application.

Referring to FIG. 8B, settings interface 820 may include a section 822 to select providing time limit settings for groups of applications. Settings interface 820 may include an input section 824 including a list of applications associated with a particular restricted user device 110 (e.g., "App #1," "App #2," . . . "App #10"). Input section 824 may include an individual input box associated with each listed application to allow a user to include/exclude applications from a group of applications to be limited. A single time limit (e.g., "60 min.") for the selected group may then be entered by the customer. In one implementation, time limits may be provided for a particular recurring period (e.g., daily, weekly, after-school, etc.). In other implementations, a more detailed interface may be provided to restrict and/or block application use during particular time-slots. Settings interface 820 may be suitable, for example, when a customer seeks to limit overall use of particular types of applications.

Although FIGS. 8A and 8B show exemplary user interfaces associated with customer terminal 120, in other implementations, customer terminal 120 may present user interfaces with different or additional information than depicted in FIGS. 8A and 8B. Also, customer interface module 610 may provide different formats for user interfaces 810 and 820 depending on the type of device used for customer terminal 120.

Figure 9:
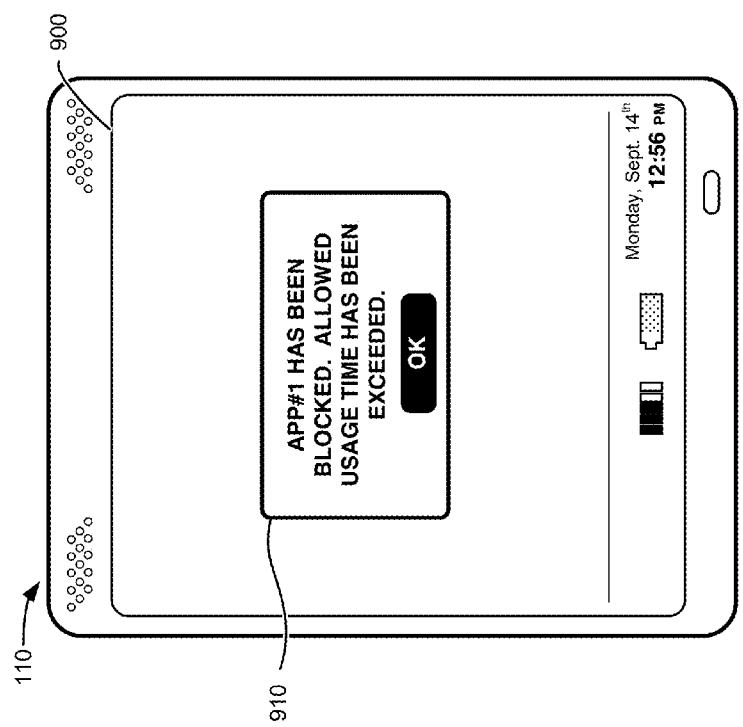
FIG. 9 is a diagram of an illustrative user interface for a restricted user device according to implementations described herein.

FIG. 9 is a diagram of an illustrative user interface for a blocking notification message that may be presented on restricted user device 110 according to an implementation herein. FIG. 9 provides a view of restricted user device 110, including a display screen 900, with a blocking notification window 910 displayed. Blocking notification window 910 may be generated, for example, by blocking module 530 described above. Blocking notification window 910 may include, for example, an indication that access to a particular application has been blocked (e.g., "App#1 has been blocked") and an explanation for the block (e.g., "Allowed usage time has been exceeded"). In another implementation, blocking notification window 910 may also include additional information, such as how long the block will remain in effect, a link to view current restriction settings, etc.

Although FIG. 9 shows an exemplary user interface associated with restricted user device 110, in other implementations, restricted user device 110 may present user interfaces with different or additional information than depicted in FIG. 9. Also, blocking module 530 may provide different formats for blocking notification window 910 depending on the type of device used as restricted user device 110.

Figure 10:
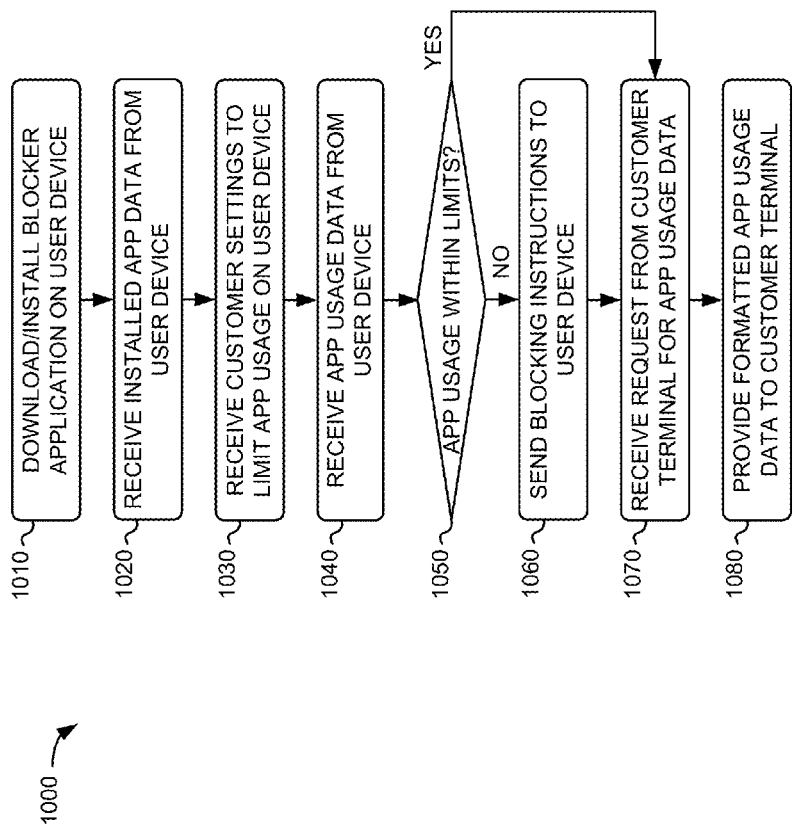
FIG. 10 is a flow chart of an exemplary process for controlling application usage according to implementations described herein.

FIG. 10 is a flow chart of a process 1000 for restricting application usage on user devices according to implementations described herein. In one implementation, process 1000 may be performed by tracking server 130 and/or application server 140. For example, process 1000 may be performed by one or more processing units 320. In another implementation, some or all of process 1000 may be performed by another device or group of devices, including or excluding tracking server 130 and/or application server 140.

As illustrated in FIG. 10, process 1000 may include downloading and/or installing a blocker application on a user device (block 1010) and receiving installed application data from the user device (block 1020). For example, in implementations described above in connection with FIG. 4, application server 140 may provide blocker application 430 and/or blocker application updates to restricted user device 110. Blocker application 430 may include monitoring instructions/criteria, a directory structure, connection information for tracking server 130, and other information to facilitate logging and/or blocking of application use on restricted user device 110. Blocker application 430 may cause restricted user device 110 to identify applications, residing on restricted user device 110, that are able to be monitored and/or restricted by blocker application 430. User device 110 may provide discovered applications to tracking server 130 as application list 440. Tracking server 130 may receive and store application list 440 for use in soliciting customer settings.

Returning to FIG. 10, process 1000 may include receiving customer settings to limit application usage on the user device (block 1030), and receiving application usage data from the user device (block 1040). For example, in implementations described above in connection with FIG. 4, customer terminal 120 may provide customer settings 450 to tracking server 130. Customer settings 450 may include configurations for particular applications, such as time limits or other usage restrictions, that may be enforced by tracking server 130 and/or blocker application 430. Restricted user device 110 (e.g., executing blocker application 430) may collect usage statistics of traditional applications being used on restricted user device 110. For example, restricted user device 110 may track times when applications are opened/closed, time stamps for transferring data, and/or a number of use instances of applications. Application usage information collected by user device 110 may be sent to, and received by, tracking server 130 as usage data 460.

As further shown in FIG. 10, process 1000 may include determining if the application usage is within the limits set for the user device (block 1050). For example, in implementations described above in connection with FIG. 4, tracking server 130 may receive usage data 460 and compare usage data 460 with customer settings 450 (e.g., for the particular restricted user device 110).

If the application usage is not within the limits set for the user device (block 1050—NO), process 1000 may include sending blocking instructions to the user device (block 1060). For example, in implementations described above in connection with FIG. 4, when usage data 460 indicates an application usage has exceeded parameters in customer settings 450, tracking server 130 may provide a blocking instruction 470 to restricted user device 110 (e.g., blocker application 430). Blocking instruction 470 may identify, for example, particular applications that may be rendered inaccessible to a user of restricted user device 110. If application usage is within the limits (block 1050—YES), processing may continue with the user continuing to interact with the program of choice.

If the application usage is within the limits set for the user device (block 1050—YES) or after blocking instructions have been provided, process 1000 may include receiving a request from the customer terminal 120 for application usage data (block 1070) and providing formatted application usage data to the customer terminal (block 1080). For example, in implementations described above in connection with FIG. 4, tracking server 130 may also format usage data 460 into a format that may be relevant to a customer. In response to a request from customer terminal 120, tracking server 130 may provide a user interface (e.g., a web page) to customer terminal 120 that includes usage data 460 for the particular restricted user device 110 identified in the request. Customers may view formatted data 480 on customer terminal 120, as described above with respect to FIGS. 7A-7C.

Systems and/or methods described herein may provide for broker-based management of applications residing on user devices. A customer may authorize installation of a blocker application on a user device. The customer may provide, to a tracking server, configuration settings that include time limits or other restrictions to the use of particular applications on the user device. Once the blocker application is installed and activated, the tracking server may communicate with the user device to monitor and enforce the usage restrictions.

The systems and/or methods may, thus, inform a customer (e.g., a parent or guardian operating customer terminal 120) of how often applications are being used on a particular user device (e.g., a child's mobile device) that is linked to the customer's account. This information would allow the customer, for example, to limit usage time and/or restrict access to applications during particular time periods, and to encourage better time management by the users of the restricted user device.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim 1n combination with every other claim 1n the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:

receiving, by a network device, authorization to install a blocker application on a user device that is linked to a customer account, wherein the authorization is provided from a source other than the user device, wherein the blocker application has a higher level of privilege than other applications residing on the user device so as to enable the blocker application to selectively prevent use of the other applications, and wherein the blocker application is configured to provide application usage data to the network device as a background operation that is transparent to a user of the user device;

providing, by the network device and to the user device, the blocker application;

receiving, by the network device and from the blocker application on the user device, a list of applications installed on the user device;

providing, by the network device and to a customer terminal with access to the customer account, a settings interface including the list of applications installed on the user device, wherein the settings interface includes a section to solicit usage limits for each application in the list of applications installed on the user device;

receiving, by the network device and from the customer terminal via the settings interface, customer-defined usage limits for at least one application from the list of applications;

receiving, by the network device and from the blocker application on the user device, application usage data for the at least one application from the list of applications;

comparing, by the network device, the customer-defined usage limits and the application usage data;

sending, by the network device and to the blocker application on the user device, a blocking instruction to prevent use, by a user of the user device, of the at least one application when the application usage data includes times exceeding the customer-defined usage limits; and sending, by the network device and to the customer terminal, a notification when the application usage data includes times exceeding the customer-defined usage limits.

2. The method of claim 1, wherein the user device is a different device than the customer terminal.

3. The method of claim 1, further comprising:

receiving, from the customer terminal, a request to view the application usage data; and providing the application usage data to the customer terminal.

4. The method of claim 3, wherein providing the application usage data to the customer terminal includes one or more of:

retrieving the application usage data from a memory within the network device, formatting the application usage data into a graphical format, and providing, to the customer terminal, a graphical user interface that includes a presentation of the application usage data.

5. The method of claim 1, wherein the settings interface further includes sections to define the usage limits as include one or more of:

a cumulative time limit, over a particular period, for use of the least one application;

a cumulative time limit, over a particular period, for use of a group of applications that includes the least one application; and a time period when use of the least one application is prohibited.

6. The method of claim 1, further comprising: receiving, by the network device and from the customer terminal, login information to access the customer account; and verifying, by the network device, the login information.

7. The method of claim 1, further comprising:

sending to the user device, as part of an operating system update, changes to the blocker application.

8. The method of claim 1, wherein the settings interface further includes a section for selecting a particular recurring period for the usage limits.

9. The method of claim 1, wherein the notification includes a text message or an email.

10. A network device, comprising:

a memory to store a plurality of instructions; and a processor configured to execute instructions in the memory to:

receive authorization to install a blocker application on a user device that is linked to a customer account, wherein the authorization is from a source other than the user device, wherein the blocker application has a higher level of privilege than other applications residing on the user device so as to enable the blocker application to selectively prevent use of the other applications, and wherein the blocker application is configured to provide application usage data to the network device as a background operation that is transparent to a user of the user device, provide, to the user device, the blocker application, receive, from the blocker application on the user device, information identifying a list of applications installed on the user device, provide, to a customer terminal, a settings interface including the list of applications installed on the user device, wherein the settings interface includes a section to solicit usage limits for each application in the list of applications, receive, from the customer terminal, usage time limits for at least one application from the list of applications, receive, from the blocker application on the user device, application usage data for the at least one application from the list of applications, monitor the application usage data received from the blocker application on the user device against the usage time limits received from the customer terminal, format the application usage data for presentation to a customer, and provide the formatted application usage data to the customer terminal.

11. The network device of claim 10, wherein the usage time limits include a shared time limit among multiple applications from the list of applications.

12. The network device of claim 10, wherein, when formatting the application usage data, the processor is further configured to configured to execute instructions in the memory to:

format the application usage data in relation to the usage time limits, or format the application usage data in relation to usage data for other applications of the list of applications.

13. The network device of claim 10, wherein the processor is further configured to configured to execute instructions in the memory to:
store the application usage data and the usage time limits.

14. The network device of claim 10, wherein the processor is further configured to configured to execute instructions in the memory to:
send, to the user device, a blocking instruction to prevent use, by a user of the user device, of the at least one application when the application usage data includes times exceeding the usage time limits.

15. The network device of claim 10, wherein the processor is further configured to:
provide, to the customer terminal, an interactive user interface that includes the list of applications installed on the user device and an input mechanism to set or modify the usage time limits.

16. A user device, comprising:
a memory to store a plurality of instructions; and
a processor configured to execute instructions in the memory to:
receive, from a network device, a blocker application that is linked to a customer account, wherein the blocker application has a higher level of privilege than other applications residing on the user device so as to enable the blocker application to selectively prevent use of the other applications,
identify, via the blocker application, the other applications residing on the memory of the user device,
send, to a network device and via the blocker application, a list of the identified applications,
record, via the blocker application, usage times of applications in the list of applications,
send, via the blocker application and to the network device, the usage times of applications in the list of applications, wherein the usage times are sent as a background operation that is transparent to a user of the user device,
receive, from the network device, a blocking instruction to prevent use, by a user of the user device, of at least one application in the list of applications, when the usage times of the at least one application exceed a customer-defined usage limit, and
block access to the at least one application based on the receiving the blocking instruction.

17. The user device of claim 16, wherein the processor is further configured to execute instructions in the memory to:
receive, from the network device, an indication that the usage limits are
configured for the user device.

18. The user device of claim 16, wherein the user device includes one of:
a personal communications system (PCS) terminal,
a tablet computer,
a wireless device,
a cellular telephone,
a smart phone,
a laptop computer,
a music playing device, or
a portable gaming device.

19. A method, comprising:
receiving, by a user device, a blocker application that includes a higher level of privilege than other applications residing on a memory the user device, wherein the blocker application is linked to a customer account;
identifying, by the user device and via the blocker application, the other applications residing on the memory of the user device;
sending, by the user device and to a network device, a list of the identified other applications;
recording, by the user device and via the blocker application, usage times of the other applications in the list of identified other applications;
sending, via the blocker application and to the network device, the usage times of the other applications in the list of identified other applications, wherein the usage times are sent as a background operation that is transparent to a user of the user device,
receive, from the network device, a blocking instruction to prevent use, by a user of the user device, of at least one application in the list of identified other applications, when the usage times of the at least one application exceed a customer-defined usage limit, and
blocking, by the user device and based on the blocking instruction, access to the at least one application when the usage time for the at least one application exceeds a corresponding one of the usage limits.

20. The method of claim 19, further comprising:
presenting, to a user of the user device, a notification when access to the particular application has been blocked.

* * * * *